Nov. 4, 1969     R. I. MARKEY     3,476,454
SELF-ADJUSTING BEARING
Filed Sept. 6, 1967
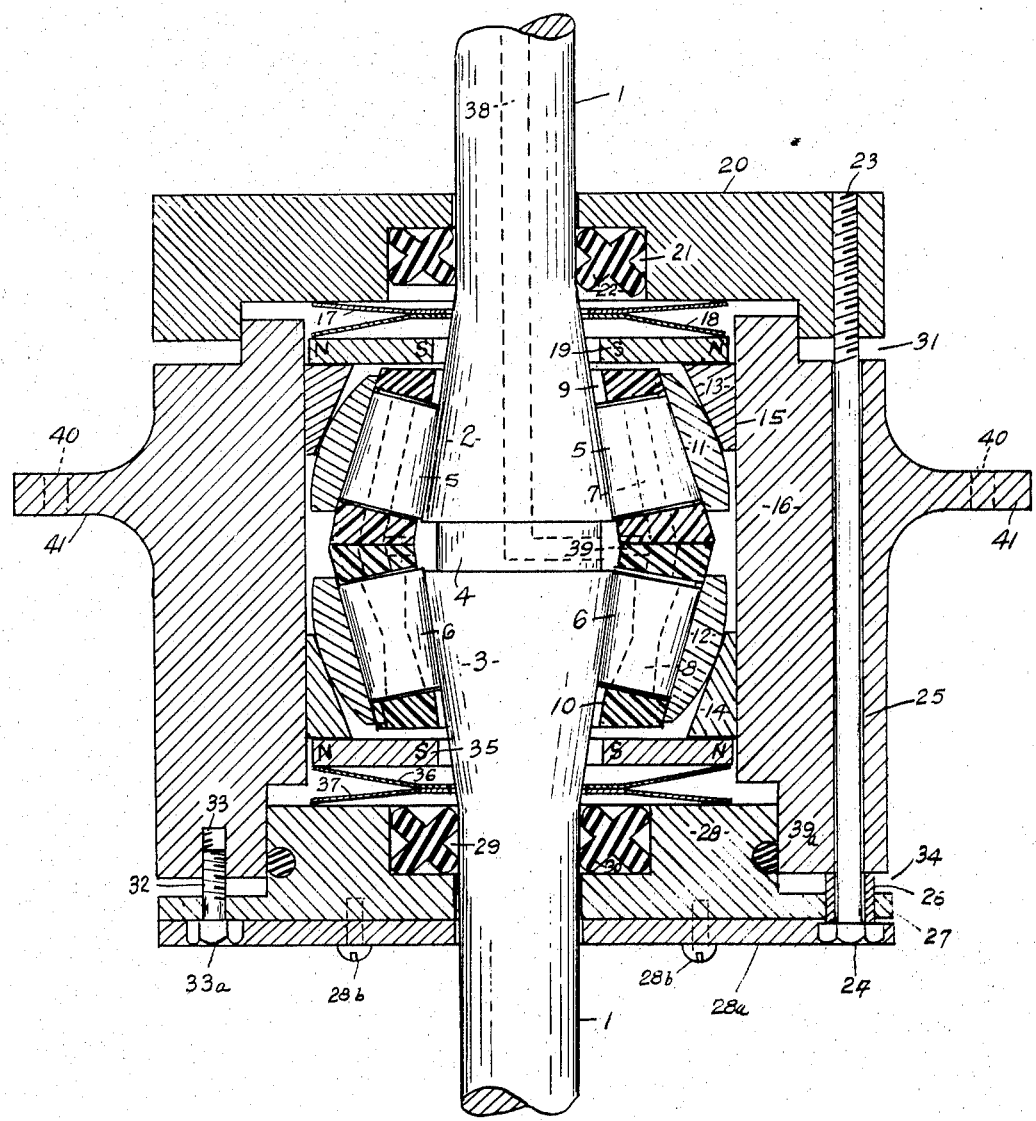
INVENTOR United States Patent Office 3,476,454
Patented Nov. 4, 1969

3,476,454
SELF-ADJUSTING BEARING
Roscoe I. Markey, Charlottesville, Va., assignor to Teledyne, Inc., Hawthorne, Calif., a corporation of Delaware
Filed Sept. 6, 1967, Ser. No. 665,764
Int. Cl. F16c 23/08, 25/08
U.S. Cl. 308—207
2 Claims

ABSTRACT OF THE DISCLOSURE

The invention is designed for use with high speed shafts in hot places as in engines or in turbine powered helicopter rotor transmissions. Means are provided to cause all rollers or similar elements of a bearing to share the load equally. Means are also provided to distribute heat efficiently and to lubricate the bearing more effectively than in prior bearings. The basic design is arranged to carry the loads under all environmental conditions to keep the stresses at minimum value.

---

This invention relates to bearings generally and particularly to bearings for use in aircraft.

Prior bearings have frequently failed, especially under conditions of high temperature or heavy loads, or both. As in helicopters, other aircraft, and even in land motor vehicles the failure of a bearing can have tragic consequences. It is therefore an object of my invention to provide bearings which will operate reliably even under severe conditions of loading, temperature, or other factors.

Another object is to provide a bearing which is self-lubricating even under high speed conditions.

A further object is to provide a bearing in which the rollers are urged to be in contact with both races in order to share the load equally and to distribute heat more efficiently even when their diameters vary due to manufacturing tolerances.

An additional object is to provide a bearing in which expansion or contraction of the housing or other bearing parts will not seriously affect the operation of the bearing.

Other objects will be evident in the following description.

The drawing shows a part sectional elevation of my improved bearing which may be used in a wide variety of machines and devices. Shaft 1 may be a part of or driven by an engine or any other device. This shaft has frusto-conical portions 2 and 3 and intervening circumferential channel 4 of reduced diameter. Frusto-conical rollers 5 and 6 have axial bores or channels 7 and 8 and are rotatable in slots in respective split cage rings 9 and 10 made of a composite of silver and fluorocarbon resin or some other suitable material or composite substance which has high heat conductivity and lubricity at elevated temperatures. The cage rings 9 and 10 are split in a plane parallel to the shaft axis. This permits the cage ring to expand or contract more than the race ring without developing high stresses in the race ring or cage ring.

Rings 11 and 12, shaped as indicated, surround respective rollers 5 and 6. These rings have conical inside races and spherically curved surfaces in contact with respective cam rings 13 and 14. This gives the bearing a self-aligning feature so that it will operate satisfactorily even though the shaft axis is not exactly centered or the cylindrical wall 15 or other parts are not of uniform manufacture or if they are mis-aligned. The rollers 6 are indicated as having channels which diverge toward the roller ends. All of the rollers can be of this construction if desired. The thinner end sections allow the rollers to yield sufficiently to come into proper contact with the races even though the rollers may be of larger diameter at one end than at the center; the load being largely carried by the relatively thick mid-section. These rollers can thus adjust even though a roller may be of less than normal diameter at the other end.

Due to the above-described design of the rings 11 and 12, the centers of the spherical surfaces for both mating rings lie at the same point on the center line of the shaft. Thus the planes of the conical race rings can roll about without increasing the contact load on the rollers. This permits self-aligning without changing the contact stresses. My bearing provides self-aligning without scrubbing action between rollers and race ways since the roller-race contacts are on straight lines which meet on the center line of the shaft at the same point for both the outer and inner race ways. This provides true rolling and no sliding at all times. In addition, this bearing has no free play at any time.

Ring 13 of wedge-shaped cross section has a gap or cut-out so that it can be slightly reduced in diameter under pressure. This ring surrounds ring 11 and is in contact therewith. Wedge shaped ring 14 is split and is similar in construction and function to ring 13. Ring 14 is in contact with ring 12.

The surface 15 of the bearings casing or body 16 helps to guide rings 13 and 14 which are movable in axial direction. Annular springs 17 and 18 surround shaft 1 and are placed between ring magnet 19 and ring 20. Magnet 19 is axially slidable in the inner cylindrical space of member 16. Springs 17 and 18 urge ring 13 in a direction to keep rollers 5 in contact with shaft portion 2 and with outer race 11. Ring 20, having cylindrical space 21 to hold synthetic rubber or other packing ring 22, has threaded bores in which bolts 23 are screwed. These bolts pass through bores 25 in body 16 and are provided with heads 24. There are a plurality of equally spaced bolts 23 having surrounding collars 26 resting against body 16 and passing through holes in flange 27 of ring 28 which surrounds the shaft. This ring has cylindrical space 29 in which packing ring 30 is placed. It will be seen that if heads 24 are turned in proper direction the ring 20 will be pulled toward bearing body 16, the gap 31 being left for that purpose. This movement will increase the force of the springs against ring 13.

There are also a plurality of equally spaced bolts or screws 32 which may be screwed into threaded holes 33 in body 16 in order to shift ring 28 in axial direction. Gap 34 between ring 28 and member 16 is arranged to permit this shift. Annular magnet 35 is axially slidable in the inner cylindrical space of member 16 and is pressed against ring 14 by annular springs 36 and 37 which urge the magnet and ring 14 and ring 12 in an axial direction tending to keep rollers 6 in contact with portion 3 of shaft 1 and in contact with outer race 12. The magnets 19 and 35 have poles as indicated. These magnets are for the purpose of pulling under-sized rollers 5 or 6 in directions so that these rollers of lesser diameter are also in contact with both inner and outer races.

If all the rollers are kept in contact with both inner and outer races 2 and 11 and 3 and 12, there is a better flow of heat to the outside so that the bearing will be better cooled, and rollers will be loaded uniformly. By inner and outer races the rollers will always be in contact with both races even though there is relative expansion or contraction of the bearing casing or other parts due to change of temperature. By turning bolt heads 24 the axial position of member 20 and the axial pressure on ring 13 can be adjusted, and by turning bolt heads 33a the axial position and pressure on ring 12 can be adjusted.

Grease may be supplied under pressure to circumferential groove 4 through axial channel 38 and suitable holes. This grease may be supplied to the rollers through grooves or slots 39 in cages 9 and 10. The packing rings 22 and 30 prevent metal or other particles from entering the bearing and the outside portion 28 of the bearing has O-ring 39a to prevent leakage of grease.

In operation, the bearing may be attached to a suitable support which may be a casing or other device or member. If there is an inside and outside the bearing member 28 should be outside. It will be seen that if the bearing casing 16 either expands or contracts the springs will automatically keep normal rollers in contact with both races and if some rollers are of less than normal diameter the magnets will pull these rollers until they are in contact with both inner and outer respective races.

This improved bearing will therefore provide cooler operation and more reliable service than prior bearings. My bearing will be particularly valuable for helicopter and other aircraft use. The bearing may be mounted by means of screws or bolts passed through holes 40 in flange 41 projecting from the casing or bearing body 16.

Sheet or plate 28a has cut-outs similar in shape to the hexagonal bolt heads 27a and 33a. This plate is fastened to member 28 by means of screws 28b passing through suitable holes in plate 28a and threaded into holes in member 28. This plate prevents the screws or bolts 23 and 32 from turning to become loose. The plate may readily be removed by removing the screws 28b.

The plate 28a is shown as being attached by two screws 28b but it can be attached by means of washers and nuts surrounding threaded studs extending from bolts heads 24.

This invention is not limited to having races 2 and 3 on the shaft since these may be on separate inner rings fitted tightly on the shaft. Neither is the invention limited to the magnet rings since the bearing will function without them, even if less efficiently.

What I claim is:
1. In a bearing system, an inner race way, a plurality of bearing elements rollable relative to said race way, outer race means surrounding said rollable elements and in contact therewith, cam means surrounding said outer race means for forcing the latter into contact with said rollable elements, and resilient means urging said cam means in a direction to cause said outer race means to be in contact with said rollable elements, and including magnetic means adjacent said rollable bearing elements for urging said elements in directions along the axes thereof.

2. In a bearing system, an inner race way, a plurality of bearing elements rollable relative to said race way, outer race means surrounding said rollable elements and in contact therewith, cam means surrounding said outer race means for forcing the latter into contact with said rollable elements, and resilient means urging said cam means in a direction to cause said outer race means to be in contact with said rollable elements, and including another inner race way, a plurality of other bearing elements, rollable relative to said race ways, other outer race means surrounding said other bearing elements, other cam means surrounding said other outer race means for forcing the latter into contact with said other bearing elements, other resilient means urging said other cam means in a direction to cause said other outer race means to be in contact with said other rollable bearing elements, said rollable elements being tapered, and including first magnetic means adjacent the small diameter ends of one group of said rollable bearing elements for urging said elements toward said first magnetic means, and second magnetic means adjacent the small diameter ends of the other group of said rollable bearing elements for urging the elements of said other group toward said second magnetic means.

References Cited
UNITED STATES PATENTS

| | | | |
|---|---|---|---|
| 1,467,378 | 9/1923 | Hanson | 308—194 |
| 2,048,972 | 7/1936 | Scheffler | 308—194 |
| 2,062,920 | 12/1936 | Mopes et al. | 308—187 |
| 2,631,904 | 3/1953 | Frenkel | 308—215 |
| 2,983,557 | 5/1961 | Blinder | 308—187 |

FOREIGN PATENTS

| | | |
|---|---|---|
| 86,478 | 6/1921 | Austria. |

MARTIN P. SCHWADRON, Primary Examiner

FRANK SUSKO, Assistant Examiner